United States Patent [19]

Stanislaw

[11] 4,040,052

[45] Aug. 2, 1977

[54] DIGITAL VIDEO SIGNAL PROCESSING CIRCUIT

[75] Inventor: David L. Stanislaw, Hatfield, Pa.

[73] Assignee: Aradar Corporation, Horsham, Pa.

[21] Appl. No.: 700,894

[22] Filed: June 29, 1976

[51] Int. Cl.$^2$ .............................................. G01S 7/44
[52] U.S. Cl. .............................................. 343/5 VQ
[58] Field of Search ........................ 343/5 DP, 5 VQ

[56] References Cited

U.S. PATENT DOCUMENTS

| 3,422,435 | 1/1969 | Cragon et al. ............. 343/5 DP X |
| 3,531,802 | 9/1970 | Brown et al. ............. 343/5 VQ X |
| 3,623,089 | 11/1971 | Bossert ............................. 343/5 DP |
| 3,794,994 | 2/1974 | Leibowitz et al. ............... 343/5 DP |

*Primary Examiner*—T.H. Tubbesing
*Attorney, Agent, or Firm*—Paul & Paul

[57] ABSTRACT

A circuit for processing input digital video signals to produce an averaged digital video output signal. Successive periods of the digital video input signal are sequentially stored in the four shift registers. These stored signals are then simultaneously clocked out of the shift registers and operated upon by binary adders to produce an averaged digital video output signal.

2 Claims, 4 Drawing Figures

DIGITAL VIDEO SIGNAL PROCESSING CIRCUIT

BACKGROUND OF THE INVENTION

This invention relates to a signal processor for digital video signals and more specifically for a signal processing unit to process received radar signals to lessen the effect of unwanted interfering signals.

Frequently, ground and airborne radar systems operate in the presence of unwanted interfering signals. Because the return radar signal of a pulse radar is of relatively low amplitude, radar receiver sensitivities must be kept high to detect desired signals. This high sensitivity, even when coupled with a narrow bandwidth, renders the radar vulnerable to reception of unwanted interfering signals. Frequently the unwanted interfering signals are random phase. Since the desired radar return signals are coherent, it is possible to distinguish between desired signals and interfering signals by integrating the received signals over a period of time. This integration lessens the effect of the interfering signals, since the value of a random phase signal integrated over a period of time is zero.

While signal integration and enhancement techniques such as those described above are practical for use with large radar systems, where high radar sensitivity is essential, they are too complex, and costly, for use with relatively small, simple radar systems, such as a weather radar for use on light aircraft.

SUMMARY OF THE INVENTION

An object of the invention is to provide a simple circuit which will lessen the effects of noncoherent interfering signals in a radar system.

A further object of the invention is to provide a circuit which is easily fabricated from available integrated circuits to achieve a commercially practicable signal processing circuit for use with airborne radar systems.

The method of the invention consists essentially of storing successive periods of radar signal information sequentially in four shift registers, then simultaneously clocking the four shift registers to apply the stored signals to a number of binary adders to produce an averaged digital video signal. The novel processing technique of this invention produces an averaged digital video signal which reduces the effect of undesired noise input signals while maintaining adequate system sensitivity. The novel circuitry of this invention is considerably less complex than prior art circuits used to reduce the effects of noise in radar receivers, such as integration circuits.

The novel features which are considered as characteristic for the invention are set forth in particular in the appended claims. The invention itself, however, both as to construction and its method of operation, together with additional objects and advantages thereof, is best understood from the following description of specific embodiments when read in connection with the accompanying drawings.

DESCRIPTION OF THE PREFERRED EMBODIMENT

Applicant's invention comprises a signal processing circuit for use with a pulsed radar system. The circuit accepts a digital video input signal which has been produced by a conventional analog to digital conversion circuit in the receiver of the radar system. This input signal is a two-bit digital video signal and is periodic in that the signal starts immediately after the radar transmitter has transmitted a pulse and continues for a period of time determined by the position of Switch S1 of FIG. 1 which sets the range of the radar system. This period of time is shown schematically on FIG. 2a as the period $T_O$ to $T_f$. This time period varies depending upon the position of $S_1$ but is constant for any specific position of $S_1$.

Figure 3:
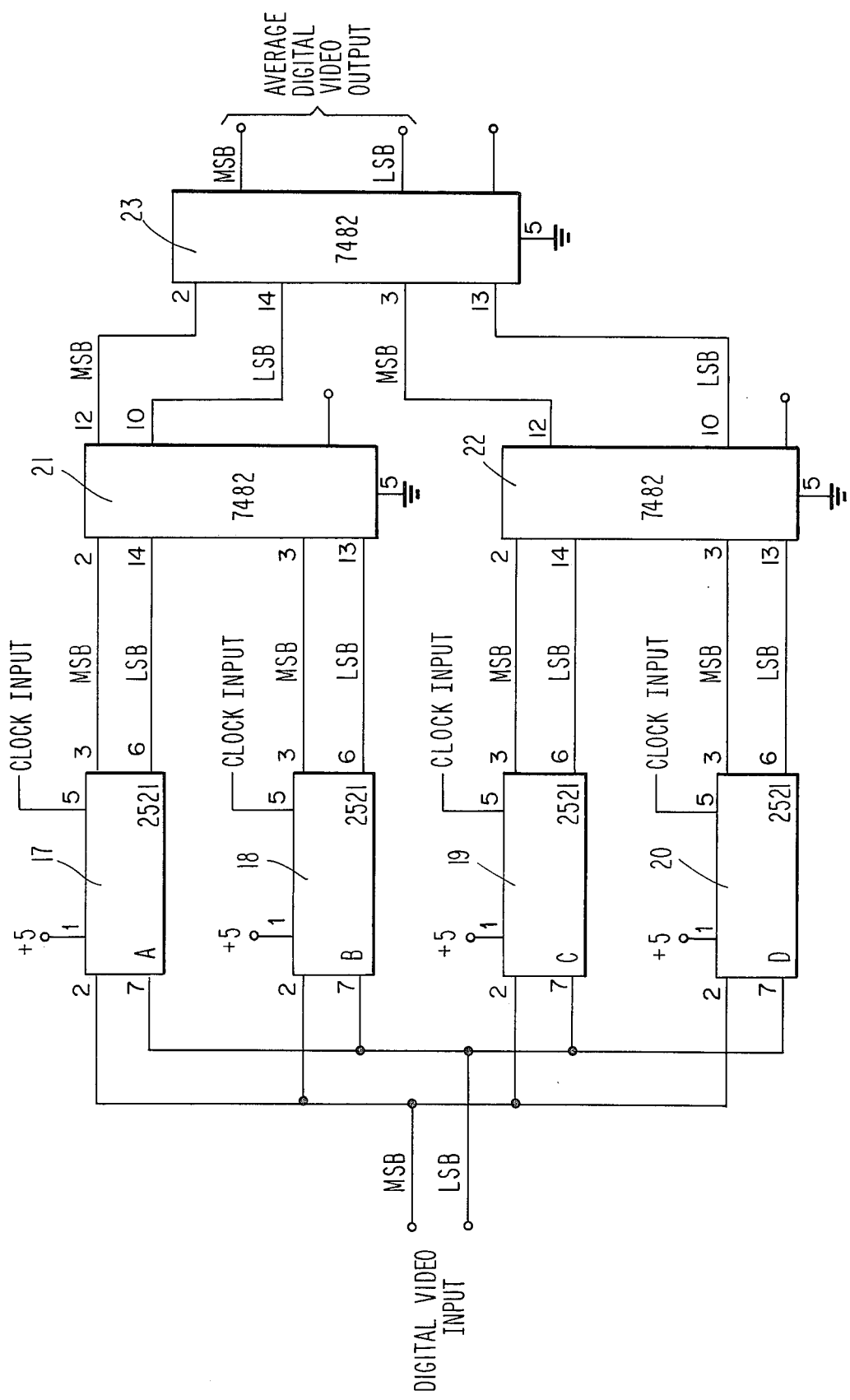
FIG. 3 is a schematic illustration of the digital video input signal processing unit circuit of this invention.

The input two-bit digital video signal is sequentially clocked into the four shift registers, A, B, C, and D of FIG. 3, so that one period of the signal is stored in each register. These signals are then simultaneously clocked out of the registers and operated upon by three adders to provide an averaged two-bit digital video signal. This averaged signal is then stored in memory, and ultimately displayed on the cathode ray tube display of the radar system.

Figure 1:
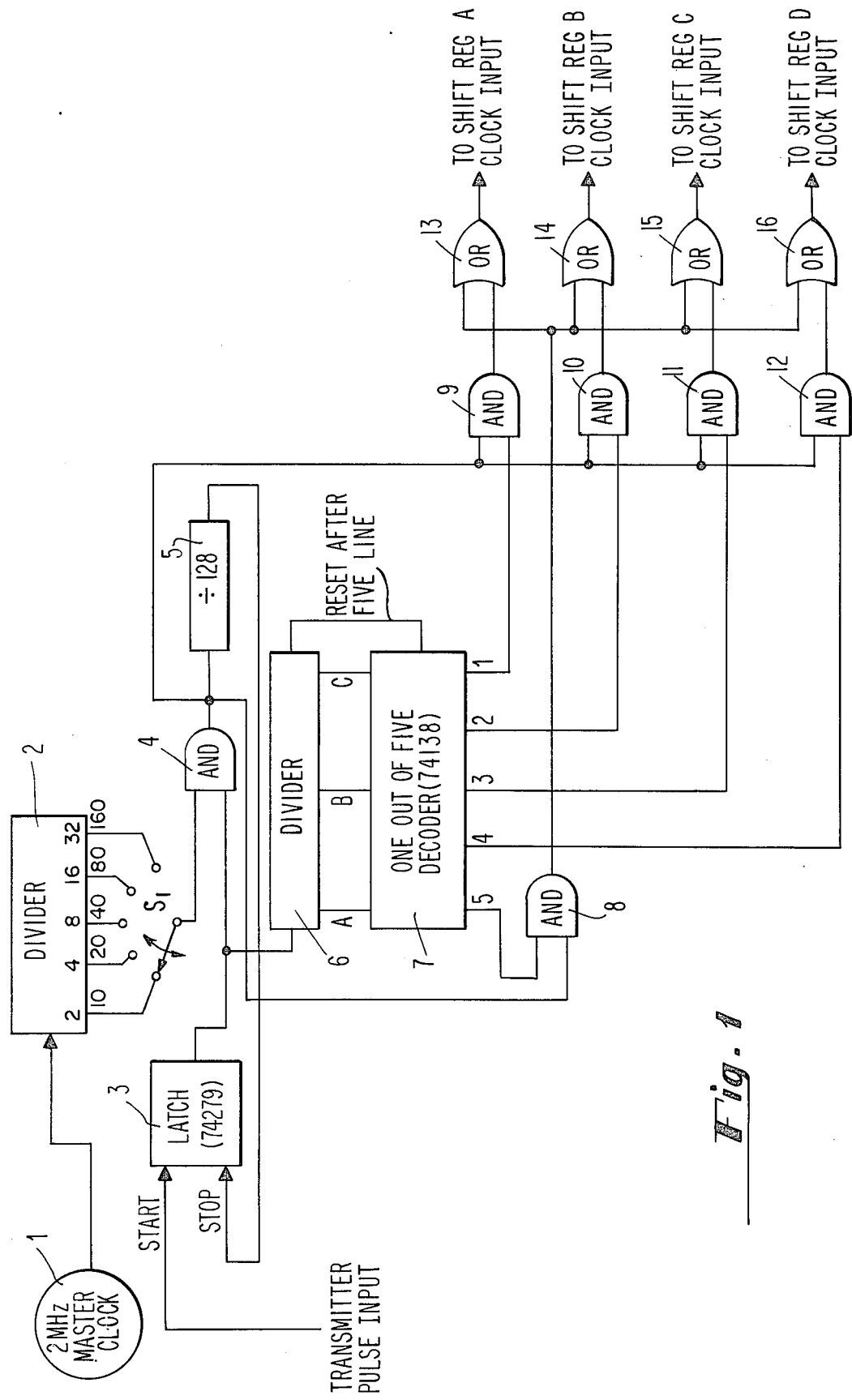
FIG. 1 is a schematic illustration of the circuitry used to generate clocking signals used to control the operation of four shift registers.

FIG. 1 is a schematic diagram of the circuitry which is used to generate the control pulses for the four shift registers shown in FIG. 3. The operation of the circuitry of FIG. 1 is as follows:

A 2 MHz Master Clock, 1, inputs pulses to Divider 2. The position of Switch $S_1$ determines the range of the radar system such as, for example, 10; 20; 40; 80; 160 miles, by controlling the number of input Master Clock pulses required before an output pulse is applied to ANDgate 4.

Latch 3, is set by a signal on the start line coincident with the transmission of a pulse by the radar transmitter. After Latch 3 is latched, the output line of the latch holds ANDgate 4 enabled allowing output pulses from Divider 2 to produce an input pulse to Divider 5.

An output pulse from Divider 5 is produced after 128 pulses have been received. The output pulse from Divider 5 unlatches Latch 3. Latch 3 will remain unlatched until another pulse from the radar transmitter occurs, which will relatch the latch and initiate the sequence again.

Each time Latch 3 is latched an input signal is applied to Divider 6. The digital output of Divider 6 appears as a three digit binary number on lines a, b, and c. The output of Divider 6 is applied to One Out of Five Decoder 7.

The output lines of Decoder 7 are successively energized. When Line Five of Decoder 7 is energized clock pulses pass through ANDgate 8, and ORgates 13, 14, 15, and 16 to the clock input terminals of shift registers A, B, C, and D illustrated in FIG. 3. Thus, when One Out of Five Decoder 7 has reached position Five the four shift registers A through D are simultaneously shifted by the output pulses of Divider 2. A reset pulse is generated after position five and used to clear Divider 6 to start the cycle over with the next transmitter sync pulse.

When the output of One Out of Five Decoder 7 is either one, two, three, or four ANDgates 9, 10, 11, or 12 respectively are enabled, making it possible for output pulses from Divider 2 to pass through ANDgate 4 and the enabled ANDgate to ORgates 13, 14, 15, or 16. For example, when an output appears on line one of One Out of Five Decoder 7 ANDgate 9 is enabled. Output pulses from Divider 2 pass through ANDgate 4 (assuming that Latch 3 has enabled ANDgate 4) and are applied to the input terminals of ANDgate 9, thence through ORgate 13 to the Clock Input Terminal of Shift Register A.

Thus, the operation of the circuitry disclosed in FIG. 1 can be summarized as follows:

Master Clock Pulses are input to Divider 2 which produces an output whose frequency is determined by the position of Switch $S_1$. When the radar transmitter produces a pulse, Latch 3 is latched enabling ANDgate 4. Output pulses from Divider 2 are then applied to Divide by 128 Divider 5. After 128 pulses have been input to Divider 5, Latch 3 is unlatched and no further pulses are applied to Divider 5 until the transmitter produces another pulse which relatches Latch 3. One Out of Five Deoder 7, in effect, counts the number of times that Latch 3 changes state. The output of One Out of Five Decoder 7 is used to sequentially enable ANDgates 9, 10, 11, and 12 and is then applied simultaneously to ORgates 13, 14, 15, and 16. Thus, the outputs of ORgates 13, 14, 15, and 16, which are applied to shift registers A, B, C, and D respectively, clock the shift registers in such a manner that two-bit digital video signals can be stored sequentially in the shift registers and then simultaneously clocked out of the shift registers.

Figure 2:
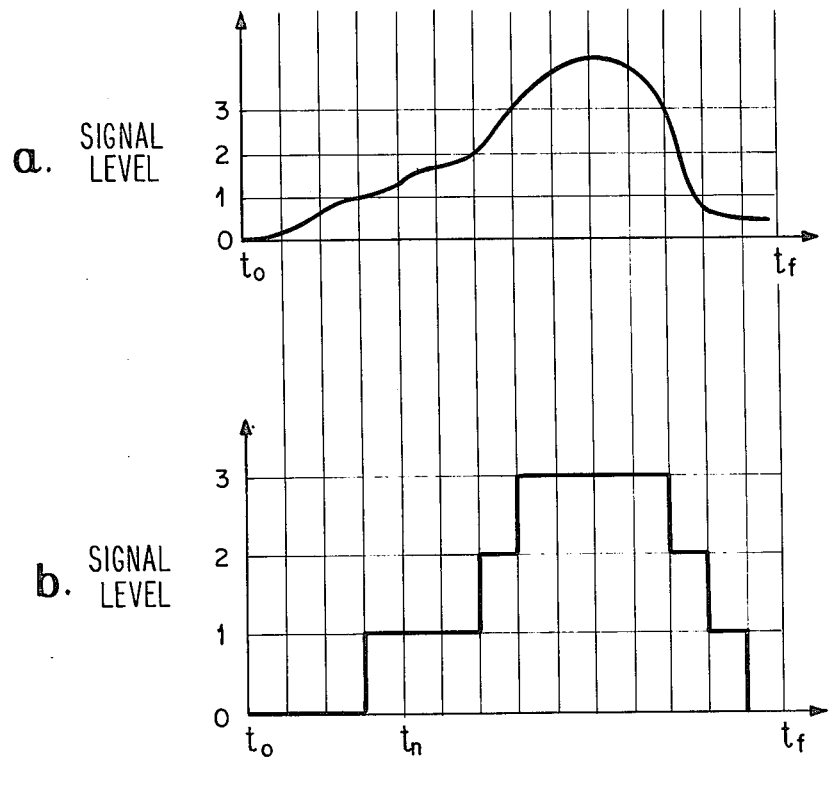
FIG. 2 is a graphical illustration of the analog to digital conversion of radar signal information.

FIGS. 2a and 2b schematically illustrate the analog to digital conversion process which produces four-level quantized digital video signals. As has been previously noted, this analog digital conversion process takes place in the radar receiver using conventional techniques. One period of the two-bit digital signal contains n discrete two-bit digital signals. For the circuit illustrated, n equals 128, but, of course, any convenient value of n could be selected.

Four successive periods of these digital video input signals are stored in shift registers, A, B, C, D, designated 17, 18, 19, and 20 respectively of FIG. 3. These signals are then simultaneously clocked out of the shift registers and each of the 128 two-bit signals contained within each period averaged with its corresponding signal in the other registers. For example, as the 128 two-bit digital signals are simultaneously clocked out of the shift registers, the signal level corresponding to the received signal at time $T_n$ will simultaneously appear at the output terminals of shift registers A, B, C, and D. These output signals, as shown in FIG. 3, are then simultaneously applied to Adders 21 and 22. The output of these Adders 21 and 22, which will be described in more detail below, are then simultaneously supplied to identical Adder 23 whose output, as also will be further described below, comprises an averaged digital video output signal.

It is desirable for the radar receiver display to portray only real targets, that is targets such as rain clouds or ground terrain, without displaying unwanted interference signals. It is well known that it is possible to distinguish between real targets and unwanted interfering noise signals by integrating the received signals over a period of time, since real targets are coherent, and interfering targets caused by noise are noncoherent. Integrating all targets over a period of time thus eliminates random phase noise signals, while preserving real targets.

The novel circuit of this invention produces results similar to that of prior art signal integration circuits without the complexity inherent in such prior art designs. The averaged digital video output present at the output terminals of Binary Adder 23 of FIG. 3 comprises a signal which has been derived by averaging four sucessive periods of digital video input signals. For example, assume that the following table represents the signal level present at time $T_n$ during four successive periods $P_1$ through $P_4$. Three different examples are shown.

Example 1 shows a condition where a constant signal of Level 1 appears during each period. The average value is, of course, 1 as shown.

|  | $T_n$ Signal Level | | |
|---|---|---|---|
|  | Example 1 | Example 2 | Example 3 |
| $P_1$ | 1 | 1 | 3 |
| $P_2$ | 1 | 3 | 3 |
| $P_3$ | 1 | 1 | 3 |
| $P_4$ | 1 | 1 | 3 |
| Average Value | 1 | 1.5 | 3 |

In Example 2 a signal of Level 3 appears once during period 2. The average signal received during the four periods is thus 1.5. Since a signal of Level 3 appears on only one of the four periods it is most likely that this represents an unwanted interfering signal. By averaging the four periods, the effect of the transitory 3 level signal is minimized.

In Example 3 a signal of Level 3 appears during all four periods, which also represents the average value.

Figure 4:
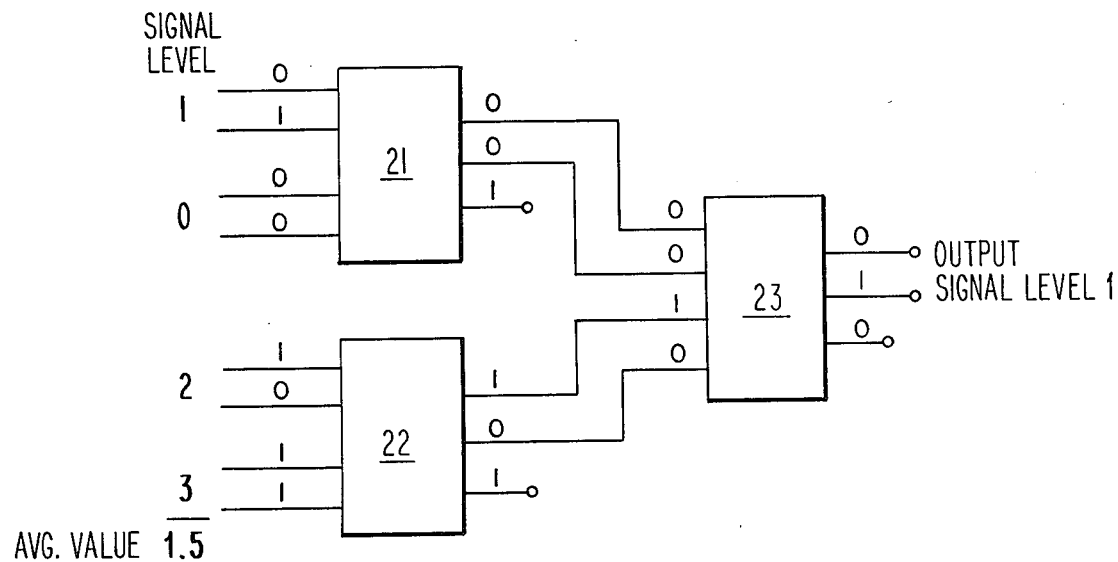
FIG. 4 is a schematic block diagram illustrating the function of the binary addition means.

By properly adjusting the sensitivity of the radar receiver, it is possible to maintain adequate receiver sensitivity, so that real targets can be detected, while only peaks of interfering noise signals are above the threshold of detection. The purpose of the averaging circuit of this invention is to minimize the effect of these transient noise signals which are detected. This is done by effectively averaging four successive signals by dividing a total of the four signals by four and disregarding any value less than unity. FIG. 4 illustrates a representative operation of the three two-bit binary adders.

Assume that four two-bit signals are present at the input terminals of Binary Adders 21 and 22 as shown. Each adder produces a three-bit digital output which represents the the sum of the two input two digit signals. The least significant bit output terminal is deliberately left unconnected and the other two output lines are connected to the next stage. This has the effect of dividing the output by 2 and disregarding any remainder as shown in the following table:

| Original Decimal Equivalent | Three-Bit Output | Two-Bit Output | Resultant Decimal Equivalent |
|---|---|---|---|
| 0 | 0 0 0 | 0 0 | 0 |
| 1 | 0 0 1 | 0 0 | 0 |
| 2 | 0 1 0 | 0 1 | 1 |
| 3 | 0 1 1 | 0 1 | 1 |
| 4 | 1 0 0 | 1 0 | 2 |
| 5 | 1 0 1 | 1 0 | 2 |
| 6 | 1 1 0 | 1 1 | 3 |
| 7 | 1 1 1 | 1 1 | 3 |

Note that the resultant decimal equivalent is equal to the original decimal equivalent divided by 2, any remainder less than 1 being disregarded.

For purposes of this disclosure, the phrase "divide by 2" means that the number is divided by 2 with any remainder less than 1 being dropped.

A specific example of the operation of the three Binary Adders 21, 22, and 23 is shown in FIG. 4. Two two-bit binary signals representing signal level 0 and 1 are applied to Adder 21 as shown. The least significant bit line of Adder 21 is disregarded and the other two lines output is input to Adder 23. Thus, Adder 21 has added signal levels 1 plus 0 and divided by 2 and rounded low to produce an output equal to 0. Similarly, input signals represenive of signals levels 2 and 3 are added by Adder 22 and divided by 2 to produce an output equal to 2. The output of Adders 21 and 22 are input to Adder 23 where they are again added together and divided by 2 to produce an output signal level of 1. This output signal level of 1 is representative of the actual average value of 1.5 for the four signals since the remainder of 0.5 which is less than unity has been dropped.

While, of course any equivalent components could be used to construct a circuit which will operate as described, the following components had been used in the circuit of the preferred embodiment:

| Component | Figure and Identification Number | Device Number |
|---|---|---|
| Latch | 1  3 | 74279 |
| One Out of Five Decoder | 1  7 | 74138 |
| Shift Registers | 3  17, 18, 19, & 20 | 2521 |
| Binary Adder | 3  21, 22, & 23 | 7482 |

While the preferred embodiment has been described employing the use of four shift registers and three adders it will be apparent to those skilled in the art that it would be possible to construct this circuit using multiples of shift registers and adders such as, for example, two shift registers and one binary adder, eight shift registers and seven binary adders, etc.

Having fully described my invention what is claimed is:

1. A digital radar video averaging circuit for processing input periodic two-bit digital signals, each period comprising $n$ two-bit signals, said circuit comprising:
   a. Four dual n-bit shift registers, each dual shift register having a most significant bit input terminal, a least significant bit input terminal, a most significant bit output terminal, a least significant bit output terminal, and a clock input terminal, the said two-bit digital signals being applied simultaneously to the four dual shift registers through parallel connections of the least significant bit and most significant bit input terminals;
   b. Clock means to enable the four dual shift registers to sequentially store successive periods of the input signals such that a first period of $n$ two-bit signals is stored in a first shift register, the second period of n two-bit signals is stored in a second shift register, the third period of n two-bit signals is stored in a third shift register and the fourth period of n two-bit signals is stored in a fourth shift register;
   c. Clock means to shift the four dual shift registers simultaneously after the fourth shift register has been filled;
   d. First addition and division means to sum and divide by two the outputs of said first and second dual shift registers;
   e. Second addition and division means to sum and divide by two the outputs of said third and fourth dual shift registers;
   f. Third addition and division means to sum and divide by two the output of the first and second addition and division means, to produce an averaged two-bit digital output signal.

2. The circuit of claim 1 wherein the first, second, and third addition and division means each comprise a two-bit binary adder having two two-bit input terminals and one three-bit output terminal, the least significant bit line of the output terminal not being connected, whereby the digital output of the remaining two lines represents the three-bit output divided by two.

* * * * *